April 28, 1964

P. CONSTANTAKES 3,131,099

MANUFACTURE OF SEMICONDUCTORS

Filed July 27, 1962

INVENTOR.
PETER CONSTANTAKES

BY James and Franklin

ATTORNEYS

United States Patent Office 3,131,099 Patented Apr. 28, 1964

3,131,099
MANUFACTURE OF SEMICONDUCTORS
Peter Constantakes, Woonsocket, R.I., assignor to General Instrument Corporation, Newark, N.J., a corporation of New Jersey
Filed July 27, 1962, Ser. No. 212,908
9 Claims. (Cl. 148—189)

This invention relates to the manufacture of semiconductors, and more particularly to the control of vapor diffusion of impurities.

In the manufacture of semiconductors it is common to form thin slices of a substantially pure monocrystal metal, typically germanium or silicon. A needed impurity is then diffused into the surface of the slice. As common examples, the impurity may be boron to make a P type semiconductor, or antimony or phosphorous pentoxide to make an N type semiconductor.

To accomplish this diffusion the slices are placed in a heated tubular diffusion chamber. This has a source tube at one end containing a small quantity of the impurity. A dry non-oxidizing gas is supplied to the source tube and carries some of the impurity with it as it flows through the chamber past the slices. The amount of diffusion of the impurity into the slices has been measured in terms of time.

However, the gas supply is also connected to the diffusion chamber for flushing purposes, and in practise the gas is flowed for a substantial time through the chamber and the source tube before heating the chamber, in order to purge the source tube and the chamber of atmosphere and particularly oxygen. Then, on heating the chamber, the flushing of the chamber but not the source tube has been continued for a substantial period of time before beginning actual diffusion by flowing the gas through the heated source tube. After completion of the desired diffusion the flow through the source tube is stopped and the chamber is again flushed for some time before the heating is stopped, and the flushing is then continued for a substantial time as the chamber cools, in order to avoid excessive condensation of the impurity during cooling. This completes a first stage diffusion, which may be followed by a second stage of heating in another chamber and oven to cause deeper penetration and better tapering off of the diffused impurity. The present invention is concerned with the first stage.

It has been found difficult to accurately control the amount of diffusion in relation to the diffusion time. I have found that this difficulty arises largely because there is some diffusion during heating of the chamber up to temperature, with accompanying flow of flushing gas, and even though there is no direct flow of gas through the source tube. Similarly there is some diffusion after the flow of diffusion gas has been stopped, and while again flushing prior to and during cooling.

The object of the present invention is to overcome this difficulty, and to improve the accuracy of the measurement of diffusion in relation to diffusion time. This object is fulfilled by providing a reverse flow of gas through the source tube during flushing, thereby positively preventing diffusion prior to and following the intended and measured diffusion period.

To accomplish the foregoing general object, and other more specific objects which will hereinafter appear, my invention resides in the apparatus elements and their relation one to another as are hereinafter more particularly described in the following specification. The specification is accompanied by a drawing in which.

Figure 1:
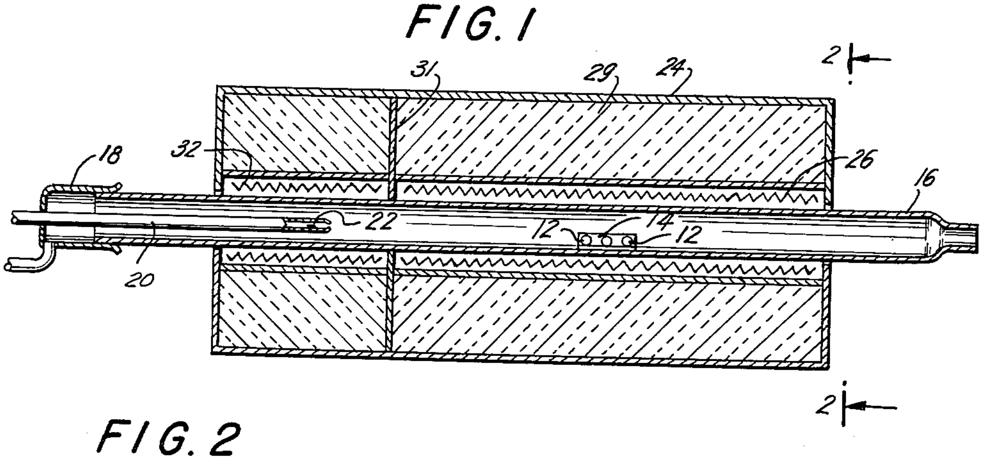
FIG. 1 is a schematic section through a vapor diffusion apparatus, to which my improvement is applied.
Figure 2:
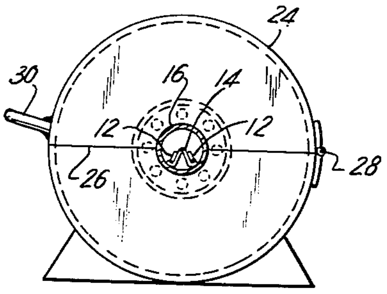
FIG. 2 is a section taken in the plane of the line 2—2 of FIG. 1.

Referring to the drawing, and more particularly to FIGS. 1 and 2, slices of the metal to be treated are indicated at 12. These are supoprted on a so-called boat 14, which is made of quartz. The boat is slid into a relatively long tubular chamber 16, which usually is a quartz tube. The entrant end has an accurately fitted closure or cap 18 which carries a slender nozzle or tube 20 in which a small quantity of the impurity is placed, as indicated at 22. Tube 20 is therefore called a source tube.

To heat the diffusion chamber, it may be removably placed in a suitable heater or oven 24. This is cylindrical and may be divided on a diametrical line 26 (FIG. 2), and hinged at 28 so that the upper half may be turned upward and rearward away from the lower half, as by means of handle 30. This facilitates placing tube 16 in, or removing it from the oven. A single oven may be used with a number of tubes, thus affording time for preliminary loading and purging of one tube, as well as cooling and unloading of another, while heating another.

The oven 24 may be constructed in different ways. In the present case there are a series of heater elements 26 which enclose the diffusion tube 16 and are themselves surrounded by a substantial body of heat insulation, indicated at 29. It is desirable to maintain different temperatures at the source tube and at the boat. This is schematically suggested in FIG. 1 by the partition 31, and by the fact that the resistance elements 32 around the impurity 22 are independent of the resistance elements 26 around the boat 14. In a typical case the temperature around the source may be, say 400° C., this temperature being adequate to vaporize the impurity, and the temperature around the boat 14 may be say 650° or 700° C., which is needed to expedite the desired penetration of the slices 12 by the impurity.

Figure 3:
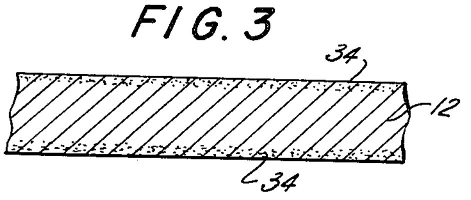
FIG. 3 is an enlarged fragmentary section through a slice of semiconductor metal, showing how an impurity is diffused into the surface of the metal.

This penetration is suggested in FIG. 3, in which slice 12 has received an impurity indicated at 34.

Figure 4:
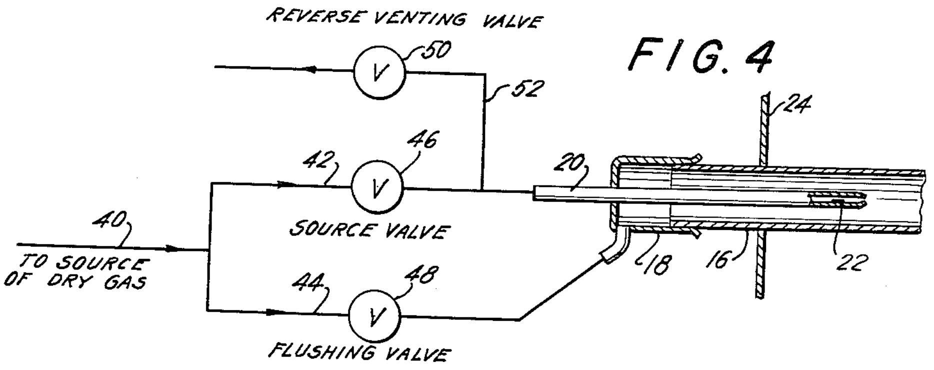
FIG. 4 is a flow diagram taken at and beyond the left end of FIG. 1, and showing my improvement.

Referring now to FIG. 4 of the drawing, a pipe 40 leads from a source of gas, which should be a dry gas which is either inert or non-oxidizing. In the particular case here shown, the gas is 85% nitrogen and 15% hydrogen. The pipe 40 divides into two pipes 42 and 44, the pipe 42 being connected to the source tube 20 through a source valve 46, and the pipe 44 being connected to the diffusion tube or chamber 16, and more specifically to the cap 18, through a flushing valve 48.

According to prior practice, the valves 46 and 48 were first opened for a flow of gas through both the source tube 20 and the diffusion tube 16 for a period of say fifteen minutes to thoroughly purge the same of atmosphere, and more particularly, oxygen. The source valve 46 was then shut and the diffusion tube 16 was bodily placed into the heating oven 24 (or alternatively, in an arrangement with the diffusion tube already in an oven, the heat would be applied). During the necessary wait for the diffusion chamber to come up to the desired high temperature, say ten minutes, a flow of gas was maintained through the flushing valve 48, but the source valve 46 was kept closed in an effort to prevent premature diffusion.

For actual diffusion the source valve 46 was then opened, the flushing valve 48 closed, the time noted, and the diffusion was continued for a desired period of time, say twenty minutes. At the end of the desired diffusion time the flushing valve 48 was opened and the source valve 46 was closed to stop the diffusion, and the flushing operation then was continued for a suitable period, say five minutes. The oven then was opened and the diffusion tube 16 was removed (or alternatively, the heat cut off), and flushing through valve 48 was continued for considerable time, say ten minutes, during initial cooling of the diffusion tube. This helps avoid excessive condensation of the impurity being used. After cooling, the cap 18 is opened, the boat 14 removed, and the slices 12 are then ready for a second diffusion stage the purpose of which is to cause deeper penetration and gradual tapering off of the diffusion, or differently expressed, to help move the junction area further inward from the outside surface of the material.

Referring again to FIG. 4, in accordance with my invention, I add a reverse venting valve 50 and a venting pipe 52 which is connected to the source tube 20, or between the source tube and the source valve 46. In the new procedure the reverse venting valve 50 may be opened whenever the source valve 46 is closed and the flushing valve 48 is opened, thus causing a reverse flow of some of the flushing gas through the source tube 20, in a direction from right to left as viewed in the drawing. This prevents unintended diffusion during the flushing periods preceding and following the diffusion period. I have found that much of the uncertainty in the relation between time measurement and the resulting quantity of diffusion, arises from the fact that even with the source valve 46 closed, there is some vaporization of the impurity from the source tube, and consequently some diffusion during the flushing periods. However, with the reverse flow here provided, there can be no travel of vaporized impurity from the source tube to the slices on the boat, except when the source valve 46 is opened and the venting valve 50 is closed.

Considered generally, the new method includes venting the source tube 20 when the source valve 46 is closed and the flushing valve 48 is opened for flushing purposes. Considered more specifically, the chamber 16 is first purged by opening both the source valve 46 and the flushing valve 48, and closing the venting valve 50. The chamber 16 is then heated, with the flushing valve 48 open for additional flushing, the source valve 46 closed, and the venting valve 50 open for reverse flow in order to prevent premature diffusion. After the chamber 16 has come up to temperature, the source valve 46 is opened, the flushing valve 48 and the reverse venting valve 50 are closed for actual diffusion, and this is continued for a desired measured time. The diffusion is accurately terminated by closing the source valve 46 and simultaneously opening the venting valve 50 and the flushing valve 48. After a desired time, say five minutes, the heating is discontinued while continuing flushing with the valves as last described, that is, with valves 48 and 50 open, and valve 46 closed.

Figure 5:
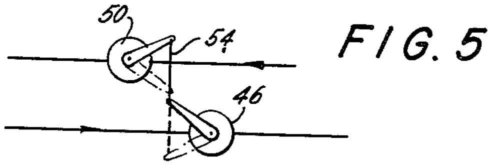
FIG. 5 corresponds to the upper part of FIG. 4 and shows a modification.

If desired, the valves 46 and 50 may be linked together, for opposite movement, so that one is always closed when the other is opened, under a single control, as shown in schematic form by the link 54 in FIG. 5.

It is believed that my improved method, and the apparatus making it possible, as well as the advantages thereof, will be apparent from the foregoing detailed description. It will also be apparent that while I have shown and described the invention in a preferred form, changes may be made without departing from the scope of the invention, as sought to be defined in the following claims. In the claims, the term "source tube" means a tube containing a body of the material which is to be diffused by passage of gas thereover and through the diffusion chamber.

I claim:

1. In the operation of a vapor diffusion system for the manufacture of semiconductors, using a source of inert gas having a flushing valve leading to the diffusion chamber and having a source valve leading to a source tube in the diffusion chamber, the method of minimizing diffusion during flushing which includes reverse venting the source tube when the flushing valve is open and the source valve is closed for for flushing purposes, so that any flow of gas in the source tube is in a direction away from the diffusion chamber.

2. In the operation of a vapor diffusion system for the manufacture of semiconductors, using a source of inert gas having a flushing valve leading to the diffusion chamber and having a source value leading to a source tube in the diffusion chamber, the method of more accurately measuring the diffusion in relation to time which includes venting the outer end of the source tube for reverse flow of inert gas through the source tube when the flushing valve is open and the source valve is closed for flushing purposes, and stopping the venting and measuring the diffusion time when the source valve is open and the flushing valve is closed.

3. In the operation of a vapor diffusion system for the manufacture of semiconductors, using a diffusion chamber, a source of inert gas having a flushing valve leading to the chamber and having a source valve leading to a source tube in the chamber, and a venting valve connected between the source valve and the source tube, the method of minimizing diffusion during flushing which includes opening the vent valve for reverse venting when the source valve is closed and the flushing valve is open, so that any flow of gas in the source tube is in a direction away from the diffusion chamber.

4. In the operation of a vapor diffusion system for the manufacture of semiconductors, using a diffusion chamber, a source of inert gas having a flushing valve leading to the chamber and having a source valve leading to a source tube in the chamber, and a venting valve connected between the source valve and the source tube, the method which includes heating the chamber with the flushing valve open, the source valve closed, and the venting valve open, diffusion for a desired time with the source valve open and the flushing and venting valves closed, terminating the diffusion and again flushing by closing the source valve and opening the venting and flushing valves, and discontinuing the heating of the chamber.

5. In the operation of a vapor diffusion system for the manufacture of semiconductors, using a diffusion chamber, a source of inert gas having a flushing valve leading to the chamber and having a source valve leading to a source tube in the chamber, and a venting valve connected between the source valve and the source tube, the method which includes purging the chamber by opening both the source and flushing valves and closing the venting valve, heating the chamber with the flushing valve open, the source valve closed, and the venting valve open for additional flushing, diffusing for a desired time with the source valve open and the flushing and venting valves closed, terminating the diffusion and again flushing by closing the source valve and opening the venting and flushing valves and discontinuing the heating of the chamber.

6. In the operation of a vapor diffusion system for the manufacture of semiconductors, using a diffusion chamber, a source of inert gas having a flushing valve leading to the chamber and having a source valve leading to a source tube in the chamber, and a venting valve connected between the source valve and the source tube, the method which includes purging the chamber by opening both the source and flushing valves and closing the venting valve, heating the chamber with the flushing valve open, the source valve closed, and the venting valve open for additional flushing, diffusing for a desired time with the source valve open and the flushing and venting valves closed, terminating the diffusion and again flushing by closing the source valve and opening the venting and flushing valves, and discontinuing the heating of the chamber while continuing flushing as in the preceding step.

7. Apparatus for vapor diffusion in the manufacture of semiconductors, said apparatus comprising an oven receiving a diffusion chamber, a source tube in one end of said chamber, a source of inert gas having a source valve leading to said source tube, and having flushing valve leading to said chamber, and optionally usable means to provide a reverse flow through the source tube during flushing in order to effectively prevent diffusion except during the desired measured diffusion period.

8. Apparatus for vapor diffusion in the manufacture of semiconductors, said apparatus comprising a cylindrical oven which is openable to receive a removable tubular diffusion chamber, a source tube in one end of said chamber, a source of inert gas having a source valve leading to said source tube, and having a flushing valve leading to said chamber, and a venting valve connected between said source valve and said source tube, whereby the venting valve may be opened during flushing to provide a reverse flow through the source tube in order to effectively prevent diffusion except during the desired measured diffusion period when the source valve is open, at which time the venting valve is closed.

9. Apparatus for vapor diffusion in the manufacture of semiconductors, said apparatus comprising an oven receiving a diffusion chamber, a source tube in one end of said chamber, a source of inert gas having a source valve leading to said source tube, and having a flushing valve leading to said chamber, a reverse venting valve connected between said source valve and said source tube, and means operationally connecting the source valve and the reverse venting valve for simultaneous opposite action, whereby the venting valve is opened during flushing to provide a reverse flow through the source tube in order to effectively prevent diffusion except during the desired measured diffusion period when the source valve is open, at which time the venting valve is closed.

References Cited in the file of this patent

UNITED STATES PATENTS

| | | |
|---|---|---|
| 2,689,807 | Kempe et al. | Sept. 21, 1954 |
| 2,804,405 | Derick et al. | Aug. 27, 1957 |